United States Patent [19]

Spaetgens

[11] 4,160,390
[45] Jul. 10, 1979

[54] TUNED TORSIONAL VIBRATION DAMPER

[76] Inventor: Theodore W. Spaetgens, 6963 Fremlin Ave., Vancouver, B.C., Canada, V6P 3W3

[21] Appl. No.: 807,279

[22] Filed: Jun. 16, 1977

[51] Int. Cl.² ............................................. F16F 15/00
[52] U.S. Cl. ..................................... 74/574; 188/1 B; 64/1 V; 188/1 B
[58] Field of Search ...................... 74/572, 573, 573 F, 74/574; 64/11 R, 1 V; 248/358 R

[56] References Cited

U.S. PATENT DOCUMENTS

| | | | |
|---|---|---|---|
| 1,272,061 | 7/1918 | Lake | 74/574 |
| 1,445,715 | 2/1923 | Robinson et al. | 74/574 |
| 1,518,360 | 12/1924 | Royce | 74/574 |
| 1,543,849 | 6/1925 | Hibbard | 74/574 |
| 1,693,765 | 12/1928 | Parsons et al. | 74/574 X |
| 1,726,825 | 9/1929 | Hawkins | 74/574 X |
| 1,815,807 | 7/1931 | Stamm et al. | 74/574 |
| 1,825,402 | 9/1931 | Judson | 74/574 |
| 1,901,853 | 3/1933 | Warner | 74/574 |
| 1,906,925 | 5/1933 | Edwards | 74/574 |
| 2,013,109 | 9/1935 | Reynolds | 74/574 X |
| 2,290,588 | 7/1942 | Grondahl | 74/574 |
| 2,342,989 | 2/1944 | Ware | 74/574 |
| 2,635,483 | 4/1953 | Welsch | 74/574 |
| 2,722,849 | 11/1955 | O'Connor | 74/574 |
| 2,736,393 | 2/1956 | O'Connor | 74/574 X |
| 2,989,857 | 6/1961 | Helland et al. | 64/11 R |
| 3,036,445 | 5/1962 | Hein | 74/574 X |
| 3,077,123 | 2/1963 | Katzenberger | 74/574 |
| 3,105,392 | 10/1963 | Rumsey | 74/574 |
| 3,187,604 | 6/1965 | Hazel | 74/574 |
| 3,440,899 | 4/1969 | McGavern et al. | 74/574 |
| 3,577,802 | 5/1971 | Rumsey | 74/574 |

FOREIGN PATENT DOCUMENTS

| | | | |
|---|---|---|---|
| 2455385 | 5/1976 | Fed. Rep. of Germany | 74/574 |
| 2626369 | 12/1977 | Fed. Rep. of Germany | 74/574 |
| 248221 | 5/1926 | Italy | 74/574 |
| 200428 | 12/1938 | Switzerland | 74/574 |
| 307921 | 10/1929 | United Kingdom | 74/574 |

Primary Examiner—Samuel Scott
Assistant Examiner—Don E. Ferrell
Attorney, Agent, or Firm—Townsend and Townsend

[57] ABSTRACT

A viscous torsional vibration damper is provided for a rotatable shaft. A hub is attachable to the shaft. A housing is connected to the hub and has an internal chamber. An inertia disc is within the chamber and a fluid damping medium is placed between the inertia disc and the housing. A first set of springs for tuning the damper are connected between the housing and the hub and a second set of springs for tuning the damper are provided between the disc and the housing. One set of springs comprises spoke springs fixedly connected at each end.

3 Claims, 11 Drawing Figures

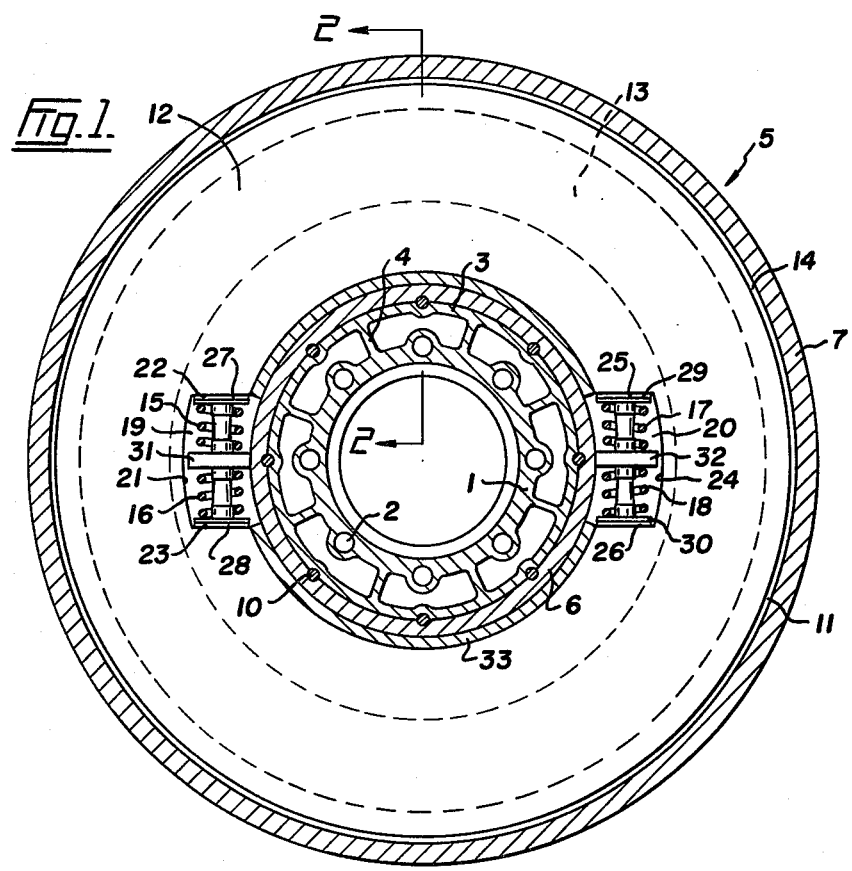
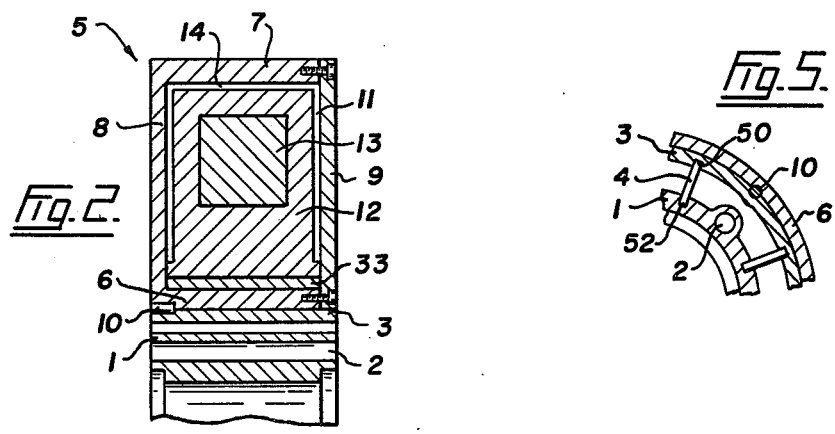
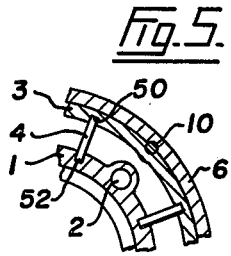
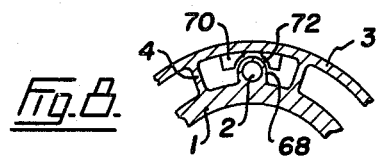

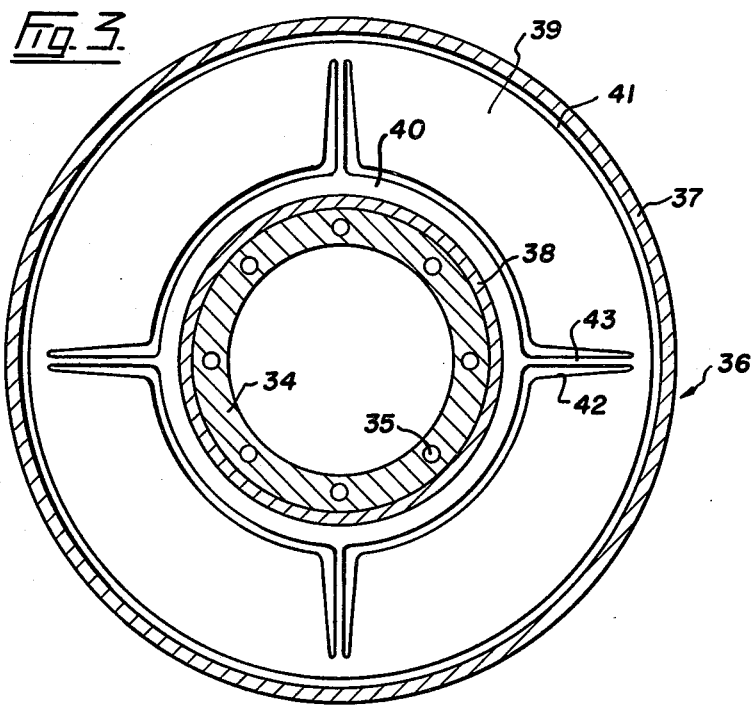
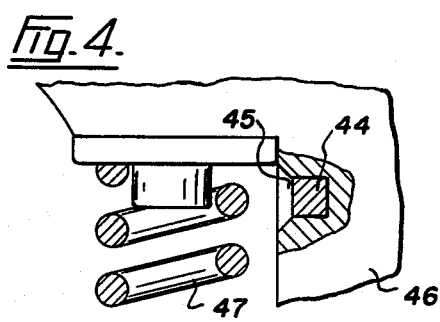
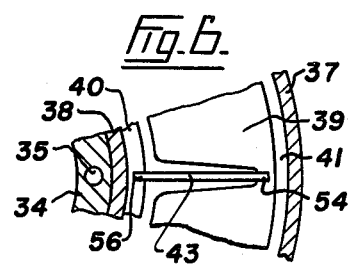
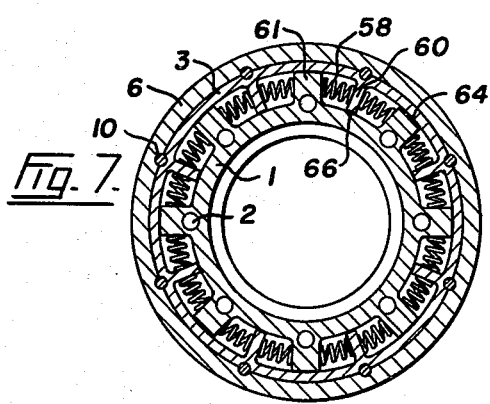
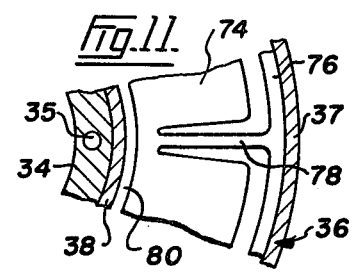

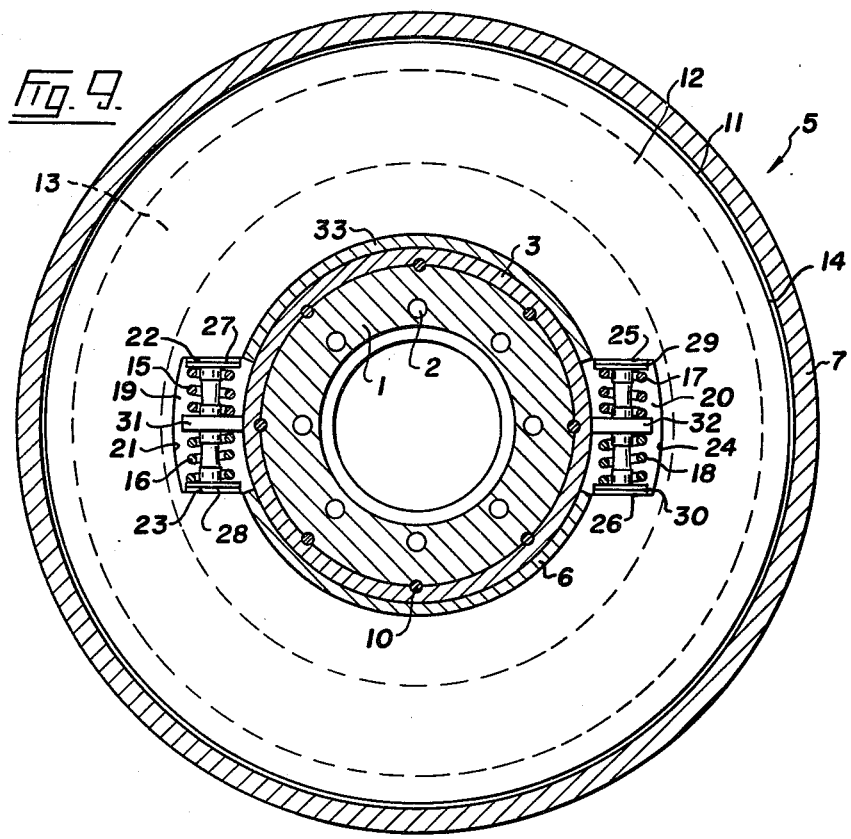
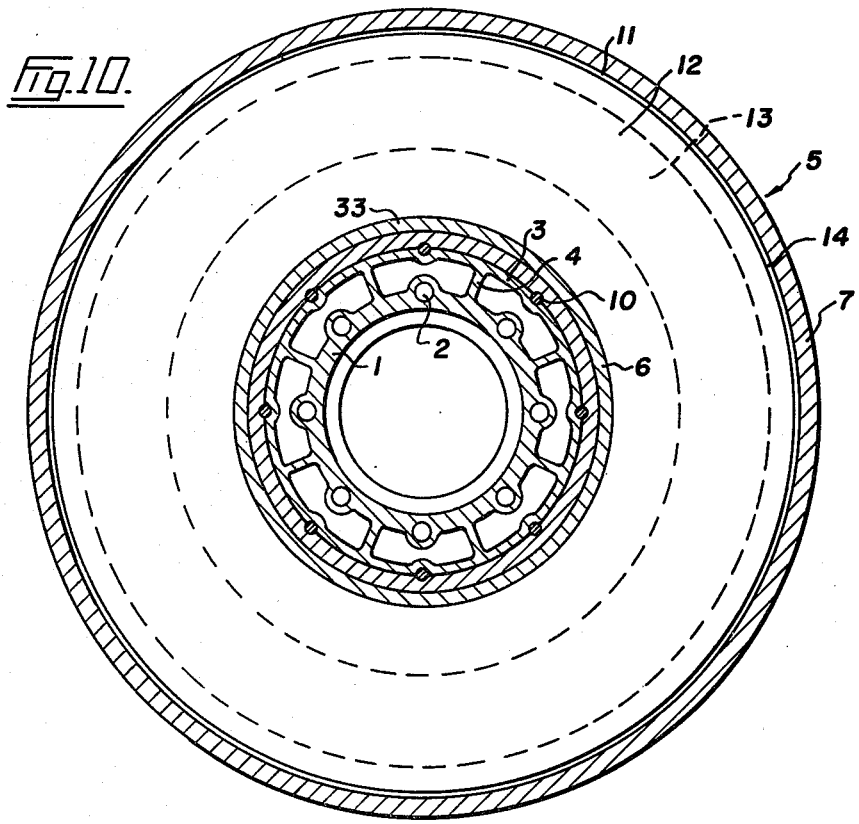

TUNED TORSIONAL VIBRATION DAMPER

BACKGROUND OF THE INVENTION

1. Field of the Invention

This invention relates to torsional vibration dampers for rotatable shafts.

2. DESCRIPTION OF THE PRIOR ART

It is known to provide a tuned torsional vibration damper for attachment to a reciprocating engine crankshaft or any rotating part of a power transmission system subjected to torsional vibration. Prior art torsional dampers have, however, displayed certain deficiencies. For example, non-metallic tuning elements have been known to be limited to a relatively short life due to their intrinsic behavior under high-cycle distortion and high temperatures; both common conditions in viscous dampers. Non-metallic tuning elements have also been known to undergo drastic changes in stiffness characteristics with age, vibration amplitude, and temperature, causing significant deterioration in damper effectiveness.

Tuned dampers which rely on non-fixed leaf or spoke springs, such as disclosed in U.S. Pat. No. 3,577,802 to Rumsey, display wear and abrasion at points of sliding contact, indeterminate and variable interleaf friction, non-linearity of stiffness, and adverse effects on the ease of analytical modelling, when laminated springs are used, and large amounts of space lost which should be available for the interia disc.

Tuned dampers, such as disclosed in U.S. Pat. No. 3,653,278 to Brinkman, utilizing the visco-elastic properties of silicone fluids, are subject to alteration in tuning with the inevitable deterioration of the silicone fluid under the shearing end temperature effects found in torsional dampers. The gradual loss in damping capability of a silicone fluid can normally be tolerated to a limited extent by itself. When the silicone fluid is used for tuning, however, the deterioration of the fluid has the compound effect of loss in damping and tuning characteristics.

A form of torsional damper utilizing resilient tuning means is found is U.S. Pat. No. 2,724,983 to O'Connor. The use of torsional shaft, as disclosed by O'Connor, requires additional bearing support for the damper and an overall damper length which is unacceptable for many applications.

SUMMARY OF THE INVENTION

According to one aspect of this invention, there is provided a torsional vibration damper for a rotatable shaft or the like. The damper comprises a hub attachable to the shaft; a housing connected to the hub and having an internal chamber; means for preventing movement between the hub and the housing; inertia means within the chamber, fluid damping medium being placeable between the inertia means and the housing; and resilient means for tuning the damper, the resilient means being radially between the hub and the inertia means.

Preferably, the housing comprises a circular inner wall, a circular outer wall spaced from the inner wall, and two disc-shaped side walls connecting the inner wall to the outer wall; the inner wall, outer wall, and side walls defining the internal chamber, and the inertia means comprises an annular-shaped inertia disc.

In a preferred form, the disc has at least one slot adjacent the inner wall, the damper including: abutment means attached to the inner wall, the resilient means comprising coil springs between the inertia disc and the abutment means.

Preferably, the inertia disc has two slots located on opposite sides of the hub, each slot defined by an outside wall and two end walls; the abutment means comprises an abutment plate projecting into each slot generally half way between the end walls; retaining plates are attached to each end wall; and the resilient means comprises four coil springs, each coil spring compressed between an abutment plate and a retaining plate.

In another preferred form, the hub comprises an inner part resiliently connected to an outer part. For example, the inner part may be resiliently connected to the outer part by integral spoke springs.

For example, the resilient means may be integral with the disc. The resilient means may be circumferentially spaced spoke springs.

According to a second aspect of the invention, there is provided a torsional vibration damper for a rotatable shaft or the like, the damper comprising a hub attachable to the shaft; a housing connected to the hub and having an internal chamber; means for preventing movement between the hub and the housing; inertia means within the chamber, fluid damping medium being placeable between the inertia means and the housing; and resilient means for tuning the damper, the resilient means being a plurality of radially extending spoke springs, each spring fixedly attached at two ends.

Viscous dampers with coil springs under compression at all times, thus providing a constant stiffness or tuning effect, reduce the damper hub vibratory amplitude, when compared with system implying untuned viscous dampers, by as much 35%–45%. By the incorporation of housing tuning, for example, when the hub comprises an inner part resilient connected to an outer part by spoke springs, the invention allows for compound tuning of the damper and the vibratory amplitude can be reduced another 40% approximately.

The use of coil springs or spoke springs fixedly attached at two ends overcomes the deficiencies in tuned dampers relying on non-fixed leaf or spoke springs. Additionally, the dampers according to the present invention are considerably more compact than those using a torsional shaft as the resilient tuning means. Further, the deficiencies related to torsional vibration dampers utilizing the viscoelastic properties of silicone fluids for tuning, are overcome by the resilient tuning employed in the present invention.

BRIEF DESCRIPTION OF THE DRAWINGS

FIG. 1 is a side elevational sectional view of a first embodiment of the invention;

FIG. 2 is an end section view of the top half of the embodiment illustrated in FIG. 1;

FIG. 3 is a side sectional view of a second embodiment of the invention, equivalent to FIG. 1;

FIG. 4 is a side sectional view of part of a third embodiment of the invention showing a portion of the inertia disc, a portion of a coil spring and a permanent magnet;

FIG. 5 is a portion of the embodiment illustrated in FIG. 1 but showing non-integral spoke springs;

FIG. 6 is a portion of the embodiment shown in FIG. 3 but including non-integral spoke springs;

FIG. 7 shows an embodiment similar to the embodiment illustrated in FIG. 1 but showing coil springs instead of spoke springs adjacent the hub;

FIG. 8 shows a portion of an embodiment similar to the embodiment shown in FIG. 1 but including limit stop means for limiting movement of the hub relative to the housing;

FIG. 9 shows an embodiment similar to that shown in FIG. 1 but without spoke springs;

FIG. 10 illustrates an embodiment of the invention similar to FIG. 1, but excluding the coil springs connecting the disc to the housing;

FIG. 11 shows a portion of an embodiment of the invention similar to the embodiment illustrated in FIG. 3 but wherein the resilient spoke springs connect the outer wall of the housing and of the inertia disc.

DESCRIPTION OF THE PREFERRED EMBODIMENT

A torsional vibration damper according to a first embodiment of the invention, is shown in FIGS. 1 and 2. The viscous damper comprises a hub 1 attachable to a shaft (not shown) by means of bolt holes 2. The hub 1 is attached to ring 3 by means of eight spoke springs 4. A housing 5 comprises circular inner wall 6 circular outer wall 7, and disc-shaped side walls 8 and 9 connecting inner wall 6 to outer wall 7. The inner wall 6 of the housing 5 is connected to the hub 1 by means of ring 3 and spoke springs 4. Dowels 10 are placed between inner wall 6 and ring 3 to prevent movement between the hub 1 and the housing 5.

Inner wall 6, outer wall 7 and side walls 8 and 9 of housing 5 define an internal chamber 11. Within chamber 11, is annular-shaped inertia disc 12. A portion 13 of the disc 12 is lead filled to increase in the inertia effect. A space 14 between outer wall 7, and side walls 8 and 9, of housing 5 and inertia disc 12 is filled with silicone fluid. The silicone fluid comprises the damping medium of the viscous damper. Coil springs 15, 16, 17, and 18 and the eight spoke springs 4 comprise resilient means connecting the hub 1 and the inertia disc 12. The inertia disc 12 has two slots 19 and 20 on opposite sides of the hub 1. The slot 19 is defined by an outside wall 21 and end walls 22 and 23. Slot 20 is defined by outside wall 24 and end walls 25 and 26. Retaining plates 27, 28, 29 and 30 are attached to end walls 22, 23, 25, and 26 respectively by bolts (not shown). Abutment plates 31 and 32 are attached to inner wall 6 of housing 5 by bolts (not shown). Abutment plate 31 projects into slot 19 half way between end wall 22 and end wall 23. Abutment plate 32 projects into slot 20 half way between end wall 25 and end wall 26. Coil spring 15 is compressed between abutment plate 31 and retaining plate 27 and coil spring 16 is compressed between abutment plate 31 and retaining plate 28. Likewise, coil spring 17 is compressed between abutment plate 32 and retaining plate 29 and coil spring 18 is compressed between abutment plate 32 and retaining plate 30. Because inertia disc 12 is connected to inner wall 6 of housing 5 through coil springs 15, 16, 17, and 18, inertia disc 12 is rotatably movable with respect to inner wall 6. For this reason, bearing 33 is provided on housing 3.

Eight spoke springs 4 are formed integrally with the hub 1 and the ring 3. Compound tuning of the damper according to the first embodiment of the invention is possible since two means of tuning are provided. Firstly, the housing 5 may be tuned with respect to the hub 1 by altering the size and configuration of spoke springs 4. Secondly, the inertia disc 12 maybe tuned with respect to the housing 5 by altering the size and configuration of coil springs 15, 16, 17, and 18.

A torsional vibration damper according to a second embodiment of the invention is shown in FIG. 3. The second embodiment of the invention is generally similar to the first embodiment of the invention and it will be described only with respect to the differences between the embodiments. Hub 34 is attachable to a shaft (not shown) by means of bolt holes 35. Housing 36 has a circular outer wall 37 and a circular inner wall 38. The housing 36 has side walls (not shown) similar to side walls 8 and 9 in FIG. 2. Inner wall 38 is fixedly attached to hub 34 and rotatable therewith. Ring 40 is attached to the inner wall 38 of the housing 36 and rotatable therewith. Spoke springs 43 are fixedly attached to inertia disc 39 at one end within radially oriented slots 42 and fixedly attached to ring 40 at the other end, spoke springs 43, ring 40, and disc 39 being integral in the present embodiment. Space 41 between inertia disc 39 and outer wall 37 is filled with silicone damping fluid. It should be noted that no bearings are required in the second embodiment of the invention.

In a third embodiment of the invention, shown in FIG. 4, permanent magnet 44 (only one of which is shown) are provided in cavities 45 at each end of each coil spring 47, (only one of which is shown) to pick up ferrous particles resulting from wear of the components. The magnets 44 are the full width of the disc 46.

A fourth embodiment of the invention, shown in FIG. 5, is similar to the first embodiment of the invention shown in FIG. 1 but spokes springs 4 are non-integral with the hub 1 and the ring 3. Instead, spokes 4 are press fitted into slots 50 in ring 3 and slots 52 in hub 1.

FIG. 6 illustrates a fifth embodiment of the invention similar to the embodiment shown in FIG. 3 but including non-integral spoke springs. Spokes springs 43 are press fitted into slots 54 in disc 38 and into slots 56 in ring 40.

FIG. 7 illustrates an embodiment of the invention similar to that shown in FIG. 1 but including coil spring 58 resiliently connecting the hub 1 to the ring 3. Only the central portion of the embodiment adjacent the hub is shown. Coil springs 58 are each compressed between projections 60 on ring 3 and projections 61 on hub 1. Projections 61 have an end 64 providing a bearing surface for ring 3. Also, projections 60 have an end 66 providing bearing surfaces for hub 1.

FIG. 8 illustrates a sixth embodiment of the invention similar to FIG. 1 but including limit stops between hub 1 and ring 3. Only a portion of the hub and ring are shown and one limit stop though a plurality of stops may be employed. The limit stop includes projection 68 on hub 1 and engaging element 70 attached to ring 3 having a recess 72. The rotation of hub 1 relative to ring 3 is limited by the coaction of projection 68 with the recess 72.

An eighth embodiment of the invention is illustrated in FIG. 9 which is similar to the embodiment shown in FIG. 1 and like parts are numbered the same. In this embodiment, however, spoke springs 4 have been removed and replaced with a solid hub 1. This embodiment does not provide for compound tuning but resilient tuning between the disc 12 and housing 5 is possible by means of the four coil springs 15, 16, 17, and 18.

FIG. 10 illustrates a ninth embodiment of the invention generally the same as the embodiment shown in FIG. 1 and like parts are numbered the same. In this embodiment, however, the coil springs are omitted and the disc 12 is not connected to the hub 1. This damper is tuned by means of spoke springs 4 between ring 3 and hub 1.

A tenth embodiment of the invention is illustrated in FIG. 11. This embodiment is similar to that shown in FIG. 3 but including a ring 76 fixedly attached to outer wall 37 of housing 36 and rotatable therewith. Spoke springs 78 (only one of which is shown) is fixedly attached at one end to ring 76 and at the other end to inertial disc 74, the inertia disc 74, spoke springs 78, and ring 76 being integral in the present embodiment. A gap 80 for viscous fluid is provided between disc 74 and inner wall 38.

In a further embodiment of the invention, the ring 40, in the embodiment shown in FIG. 6, is integral with the inner wall 38.

In another embodiment of the invention, ring 3, in the embodiment shown in FIG. 5, is integral with the inner wall 6 of the housing 5 shown in FIG. 1.

In another embodiment of the invention, the bearing 33, shown in FIG. 1 is provided on inertia disc 12 instead of on housing 3.

In another embodiment of the invention, the embodiment of the invention illustrated in FIG. 3 could have spoke springs similar to spokes springs 4 between hub 1 and ring 3 as shown in FIG. 1.

While each of the above embodiments includes only one inertia disc, alternative embodiments of the invention include more than one inertia disc in one damper.

I claim:

1. A tuned viscous torsional vibration damper comprising:
   a central hub for connecting the damper to a rotatable shaft;
   a hollow cylindrical housing with a circular inner wall surrounding the hub, a circular outer wall, and disc-shaped side walls;
   an annular-shaped inertia disc within the housing with two slots extending outwardly from the inner wall of the housing;
   a bearing between the inner wall of the housing and the inertia disc for rotation of the inertia disc within the housing;
   silicone fluid between the disc and the housing;
   two abutment plates connected to the inner wall of the housing and extending radially outwards into the slots in the inertia disc;
   disc tuning means comprising four coil springs, each coil spring extending between the disc and one of the abutment plates perpendicularly to the one abutment plate;
   a ring surrounding the hub and radially spaced-apart therefrom, the inner wall of the housing being mounted on the ring; and
   housing tuning means comprising a plurality of spoke springs fixedly connected to the hub at a first end, extending radially outwards between the hub and the ring and fixedly connected to the ring at a second end.

2. A damper as claimed in claim 1, the hub, the ring and the spoke springs being integral.

3. A damper as claimed in claim 1, comprising two diametrically opposing said slots on the disc, each of the abutment plates having two sides and extending into the centre of one said slot, each of the coil springs being compressed between one side of one said abutment plate and the disc.

* * * * *